United States Patent
Beasley

(10) Patent No.: US 7,294,979 B2
(45) Date of Patent: Nov. 13, 2007

(54) LIGHT SOURCE MODULE WITH TEMPERATURE SENSOR

(75) Inventor: Matthew Beasley, Dallas, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 139 days.

(21) Appl. No.: 11/139,241

(22) Filed: May 27, 2005

(65) Prior Publication Data

US 2006/0267521 A1  Nov. 30, 2006

(51) Int. Cl.
G05F 1/00 (2006.01)

(52) U.S. Cl. .............. 315/309; 315/307; 315/291; 315/158

(58) Field of Classification Search .......... 315/309, 315/308, 291, 307, 117, 118, 112, 114, 294, 315/158, 149
See application file for complete search history.

(56) References Cited

U.S. PATENT DOCUMENTS

| | | | |
|---|---|---|---|
| 4,283,658 A * | 8/1981 | Parker ................ | 315/117 |
| 5,008,803 A * | 4/1991 | Iida ................... | 701/36 |
| 5,508,782 A * | 4/1996 | Koh et al. ............ | 355/30 |
| 5,692,821 A | 12/1997 | Rodriguez, Jr. et al. | |
| 6,268,799 B1 | 7/2001 | Miyashita et al. | |
| 6,333,602 B1 * | 12/2001 | Kayser ................ | 315/117 |
| 6,595,005 B1 | 7/2003 | Immel | |
| 6,604,829 B2 | 8/2003 | Rodriguez, Jr. | |
| 6,637,895 B2 | 10/2003 | Fujimori et al. | |
| 6,703,643 B2 | 3/2004 | Yamazaki | |
| 6,827,145 B2 | 12/2004 | Fotland et al. | |
| 6,955,434 B2 * | 10/2005 | Hsu ................... | 353/61 |
| 6,982,528 B2 * | 1/2006 | Cottongim et al. ..... | 315/309 |
| 7,038,390 B2 * | 5/2006 | Swami et al. ......... | 315/112 |
| 7,183,727 B2 * | 2/2007 | Ferguson et al. ...... | 315/308 |
| 2004/0120148 A1 | 6/2004 | Morris et al. | |
| 2004/0212787 A1 | 10/2004 | Kida et al. | |
| 2006/0158125 A1 * | 7/2006 | Pollmann-Retsch et al. | 315/106 |
| 2006/0227561 A1 * | 10/2006 | Childers et al. ...... | 362/373 |

* cited by examiner

*Primary Examiner*—Tuyet Vo

(57) ABSTRACT

A light source module includes a lamp assembly, at least one temperature sensor for monitoring a temperature of the lamp assembly, and a processor coupled to the temperature sensor and the lamp assembly, the processor being configured to operate the lamp assembly at a reduced power level when the temperature is above a first temperature threshold.

17 Claims, 3 Drawing Sheets

LIGHT SOURCE MODULE WITH TEMPERATURE SENSOR

BACKGROUND

Display systems, such as digital micro-mirror device (DMD) and liquid crystal display (LCD) projectors, project high-quality images onto a viewing surface. Both DMD and LCD projectors utilize high-intensity lamps and reflectors to generate the light needed for projection. Light generated by the lamp is concentrated as a "fireball" that is located at a focal point of a reflector. Light produced by the fireball is directed into a projection assembly that produces images and utilizes the generated light to form the image. The image is then projected onto a viewing surface.

Efforts have been directed at making projectors more compact while making the image of better quality. As a result, lamps utilized have become more compact and of higher intensity. In addition to generating light, these lamps also produce heat. In general, the higher the intensity of light generated, the greater the heat generated. A portion of this heat is frequently removed by directing cool air over the reflector.

Several factors may affect the cooling of the display system. Some systems simply cut power to the lamp assembly if these factors cause the temperature of the lamp to rise above a certain temperature. However, simply cutting power to the lamp when adverse conditions exist may be undesirable, for example, if the projector is used in a presentation, the projector will shutdown until the system cools down. After a cool down interval, the projector may be restarted to continue the presentation until the overheat conditions repeat.

SUMMARY

A light source module includes a lamp assembly, at least one temperature sensor for monitoring a temperature of the lamp assembly, and a processor coupled to the temperature sensor and the lamp assembly, the processor being configured to operate the lamp assembly at a reduced power level when the temperature is above a first temperature threshold.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A light source module is provided herein for use in display systems. According to one exemplary embodiment, the light source module includes a lamp assembly. The light source module is configured to reduce the power provided to the lamp assembly when the temperature of the lamp assembly exceeds a first temperature threshold. Further, the light source module may provide some type of indication for one or more non-catastrophic conditions which may contribute to the elevated temperature.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
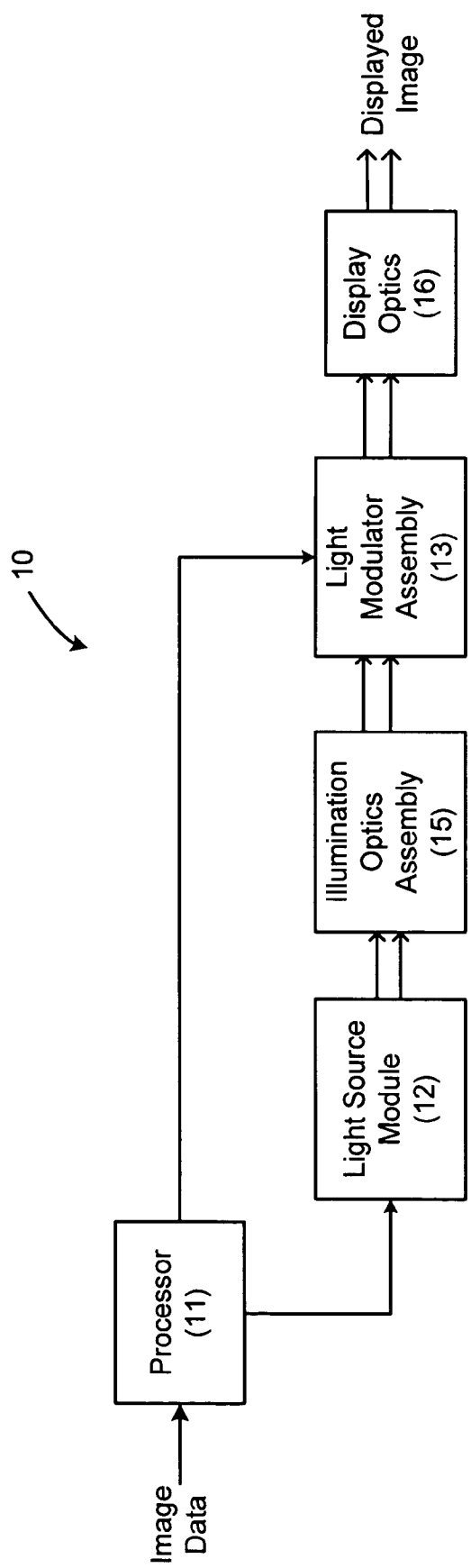
FIG. 1 illustrates a schematic view of a display system according to one exemplary embodiment.

FIG. 1 illustrates an exemplary display system (10). The components of FIG. 1 are exemplary only and may be modified or changed as best serves a particular application. As shown in FIG. 1, image data is input into a processor (11). The image data defines an image that is to be displayed by the display system (10). While one image is illustrated and described as being processed by the processor (11), it will be understood by one skilled in the art that a plurality or series of images may be processed by the processor (11). The processor (11) may perform various functions, including controlling the illumination of a light source module (12), controlling a light modulator assembly (13), and monitoring the operating conditions of the display system (10).

Figure 2:
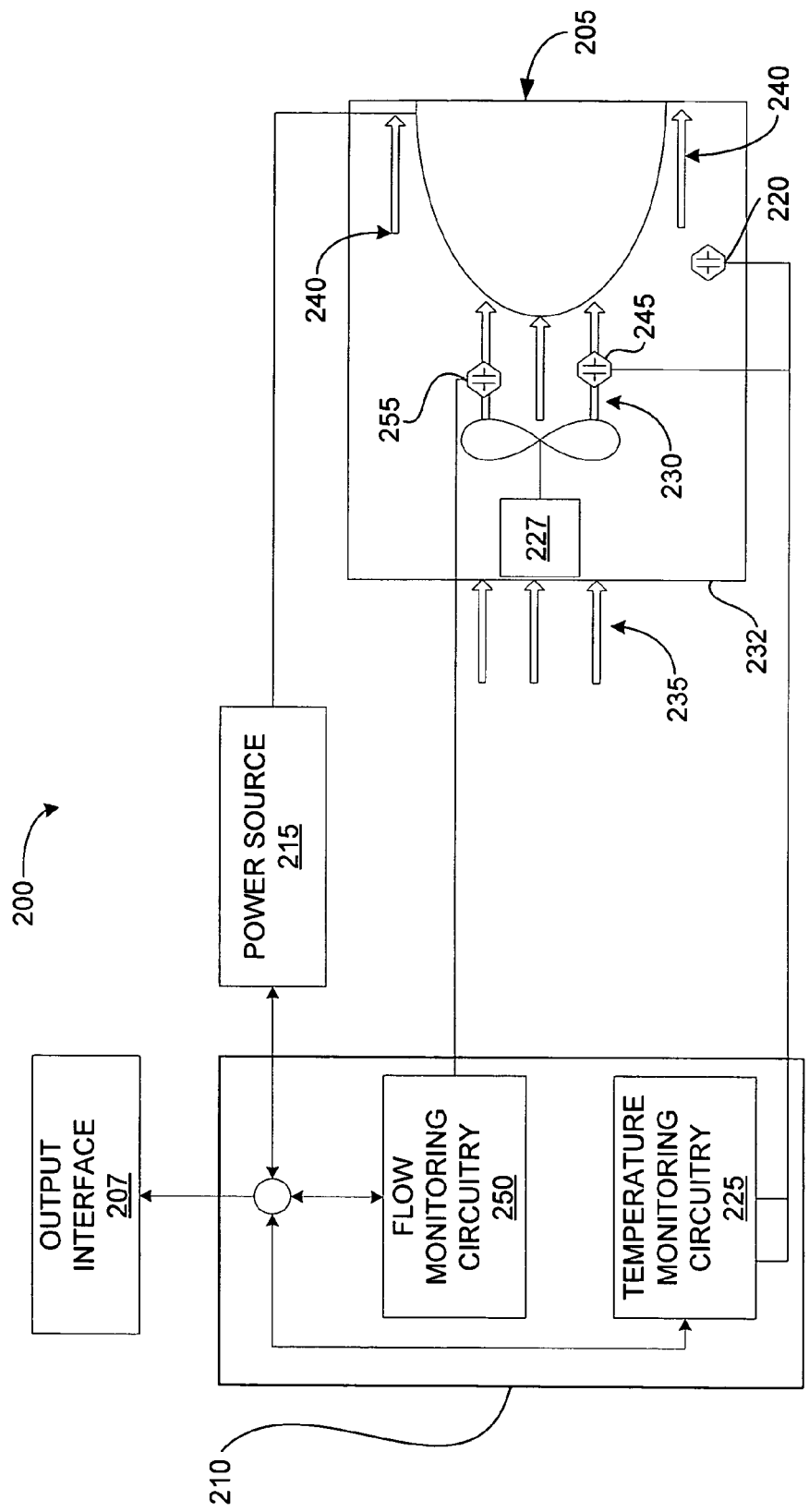
FIG. 2 illustrates a schematic view of a light source module according to one exemplary embodiment.

As will be discussed in more detail below, the light source module (12) includes a lamp assembly (205; FIG. 2), which includes an anode and a cathode coupled to a reflector; and a fan. According to one exemplary embodiment, the fan may help to maintain the lamp assembly at an acceptable operating temperature.

In particular, in addition to generating light, the light source module (12) also produces heat. The fan removes heat from the light source module (12), thereby allowing the light source module (12) to function at a suitable operating temperature. The processor (11) may monitor for a number of non-catastrophic conditions. Such conditions may include, without limitation, high ambient temperature, high altitude, installation obstructions that result in recirculation of heated air, or reduction in airflow through the display system. Such conditions may reduce the amount of heat removed by the fan, and thus increase the operating temperature of the light source module (12).

If the processor (11) senses such a non-catastrophic condition, the processor (11) may reduce power to the light source module (12) to allow the display system to continue to operate with a reduced power output. Further, the processor (11) may provide an indication of the type of the non-catastrophic event. Such an indication may allow for the non-catastrophic event to be remedied. If the non-catastrophic condition is remedied, the processor (11) may then increase power to the light source module (12) as desired.

The light source module (12) is positioned with respect to an illumination optics assembly (15). The illumination optics assembly (15) directs light from the lamp assembly of the light source module (12) to the light modulator assembly (13). The terms "light modulator assembly" and "modulator" will be used interchangeably herein to refer to a light modulator assembly. The incident light may be modulated in its frequency, color, phase, intensity, polarization, and/or direction by the modulator (13). Thus, the light modulator assembly (13) of FIG. 1 modulates the light based on input from the processor (11) to form an image-bearing beam of light that is eventually displayed or cast by display optics (16) on a viewing surface (not shown).

The display optics (16) may include any device configured to display or project an image. For example, the display optics (16) may be, but are not limited to, a lens configured to project and focus an image onto a viewing surface.

Light Source Module

FIG. 2 illustrates a schematic view of a light source module (200). The light source module (200) includes a lamp assembly (205). The light source module (200) is coupled to a processor (210). The processor (210) controls the operation of the light source module (200), which is configured to allow the lamp assembly (205) to continue to operate at reduced power when a first temperature threshold is exceeded. Further, the processor (210) may provide some indication of factor(s) that may contribute to the increased operating temperature of the lamp assembly (205).

For example, as will be discussed in more detail below, the light source module (200) may include sensors and circuitry to monitor operating conditions within the light source module (200). The processor (210) compares the operating conditions within the light source module to threshold conditions to determine an appropriate power level to provide to the lamp assembly (205).

The operation of the lamp assembly will first be discussed, followed by a discussion of the sensors and operating circuitry. The lamp assembly (205) receives power from a power source (215). In operation, the lamp assembly (205) converts a portion of the power into light. In addition to producing light, the lamp assembly (205) also produces heat as it operates. The heat thus produced by the operation of the lamp assembly (205) tends to heat the lamp assembly.

According to one exemplary embodiment, a portion of the generated heat may be removed by forced convection, as will be discussed in more detail below. At some point, the amount of heat removed due to cooling effects will be equal to the amount of heat generated by the burner assembly. At that point, the lamp assembly (205) will be at its operating temperature. Thus, the operating temperature may depend, at least in part, on the amount of heat generated by the lamp assembly and cooling effects. Consequently, the operating temperature may be controlled by controlling cooling effects or the amount of heat generated by the lamp assembly.

According to one exemplary embodiment, a temperature sensor (220) may be placed within the lamp assembly (205) to sense the operating temperature. Further, according to other exemplary embodiments, the temperature sensor (220) may be placed near the lamp assembly (205). In either case, the operating temperatures obtained by the temperature sensor may then be sent to the processor (210).

The exemplary processor (210) shown in FIG. 2 includes temperature monitoring circuitry (225). According to this exemplary embodiment, the temperature monitoring circuitry (225) compares the operating temperature of the lamp assembly (205) to a first temperature threshold. The first temperature threshold may correspond to an elevated temperature that is below a critical temperature of the lamp assembly (205). Such a critical temperature may be near a temperature above which continued heating could cause the lamp assembly to fail.

If the operating temperature of the lamp assembly (205) exceeds the first temperature threshold, the processor (210) directs the power source (215) to reduce the power supplied to the lamp assembly (205). The processor (210) also directs an output interface (207) to display a message indicating that the power has been reduced. In addition to a display indicating that the power has been reduced, the processor (210) may also provide information as to which factors may be contributing to the increased temperature within the lamp assembly (205). For example, in addition to monitoring temperature within the lamp assembly, the processor (210) may also monitor several conditions which may affect the operating temperature of the lamp assembly (205). Several of these conditions will now be discussed in more detail.

The light source module (200) according to the present exemplary embodiment is configured to sense the temperature of an airflow used to cool the lamp assembly (205). As introduced, the operating temperature of the lamp assembly (205) may depend, at least in part, on the amount of heat generated by the lamp assembly and how much of that heat is removed. The amount of heat generated by the lamp depends, at least in part, on how much power is provided to the lamp. Accordingly, the operating temperature may be controlled by controlling the amount of power provided to the lamp assembly (205) and controlling the removal of heat from the lamp assembly (205).

As shown in FIG. 2, the light source module (200) also includes a fan (227). The fan (227) is configured to help cool the lamp assembly (205). In particular, the fan (227) generates an airflow (230) that is directed to the lamp assembly (205). As the airflow (230) passes over the lamp assembly (205), the airflow convectively cools the lamp assembly. If the temperature monitoring circuitry (225) determines the temperature of the airflow (230) is above the flow temperature threshold and that the temperature within the lamp assembly (205) is above the first temperature threshold, the processor directs the output interface (207) to display information that an airflow temperature is above an acceptable threshold. Several conditions that may contribute to an increased airflow temperature will now be discussed in more detail.

In general, the amount of heat removed from an object by flowing air depends upon several factors. Some of these factors include the volumetric flow rate, the temperature, and the heat transfer properties of the air used to cool the object.

If the ambient temperature of the surroundings is elevated, the airflow (230) may also be at a higher temperature. The effectiveness of the airflow (230) in cooling the lamp assembly (205) may depend on the heat transfer properties of the airflow. More specifically, relatively cooler air is able to remove more heat than relatively warmer air with otherwise similar properties. Consequently, a higher ambient temperature may result in a relatively warmer airflow (230). A relatively warmer airflow may be able to remove less heat from the lamp assembly (205), thereby resulting in a relatively higher operating temperature for the lamp assembly (205).

Other factors may also affect the temperature of the airflow (230). For example, as discussed, the airflow (230) removes heat from the lamp assembly (205) through convective cooling. In particular, as air cools the lamp assembly (205), the airflow (230) is converted into a heated airflow (240). If the heated airflow (240) encounters obstructions in the outlet openings, some portion of heated airflow (240) may be re-circulated within the housing (232). As a portion of the heated airflow (240) is re-circulated, it may mix with the airflow, thereby raising the temperature of the airflow (230) directed to the lamp assembly (205). Thus, obstructions may reduce the effectiveness of the airflow (230) in removing heat.

According to one exemplary embodiment, the temperature control circuitry (225) may be coupled to an airflow temperature sensor (245), which may be placed in the path of the airflow (230). The temperature monitoring circuitry (225) compares the airflow temperature sensed by the airflow temperature sensor (245) to a flow temperature threshold.

As introduced, if the temperature monitoring circuitry (225) determines the temperature of the airflow (230) is above the flow temperature threshold and that the temperature of the lamp assembly (205) is above the first temperature threshold, the processor (210) reduces power to the lamp assembly (205) and directs the output interface (207) to display information that the flow temperature is above an acceptable threshold. In addition to providing information about the temperature of the flow, the processor may also monitor other factors which may affect the operating temperature of the lamp assembly.

For example, the processor (210) may include flow monitoring circuitry (250). According to one exemplary embodiment, the flow monitoring circuitry (250) may be coupled to a flow sensor (255) that is placed in communication with the airflow (230) to thereby sense the flow rate of the airflow (230).

As previously introduced, the fan (227) draws ambient air from the environment through inlet openings defined in the housing (232). If obstructions restrict the flow of air through the inlet openings, the volumetric flow rate of the airflow (230) may be reduced. The flow monitoring circuitry (250) senses the volumetric flow rate of the airflow (230) and compares the volumetric flow rate of the airflow (230) to a flow control threshold.

If the volumetric flow rate of the airflow (230) is below the flow control threshold, and if the operating temperature of the lamp assembly (205) is above the first temperature threshold, the processor (210) directs the output interface (207) to display information that the volumetric flow rate temperature is below an acceptable threshold.

For example, the output interface (207) may include an indication that the inlet opening is obstructed. Once an elevated temperature condition has been detected, the processor (210) may continue to operate the lamp assembly (205) at a reduced power level. Once the conditions have been remedied, the lamp assembly (205) may again be operated at full power.

Accordingly, the light source module (200) is configured to reduce the power provided to the lamp assembly (205) when the temperature of the lamp assembly (205) exceeds a first temperature threshold. Further, the light source module (200) may provide some type of indication for one or more factors which may contribute to the elevated temperature.

According to one exemplary embodiment, additional measures may be taken if a reduction in power is not sufficient to decrease an operating temperature of a lamp assembly (205). More specifically, in addition to reducing power once the first temperature threshold has been surpassed, the light source module (200) may be configured to suspend operation of the lamp assembly (205) when a second temperature threshold has been surpassed. The second temperature threshold may be near or below the critical temperature discussed above. Such a configuration may allow the lamp assembly (205) to be suspended to minimize failure of the lamp assembly (205).

Operation of a Lamp Assembly

Figure 3:
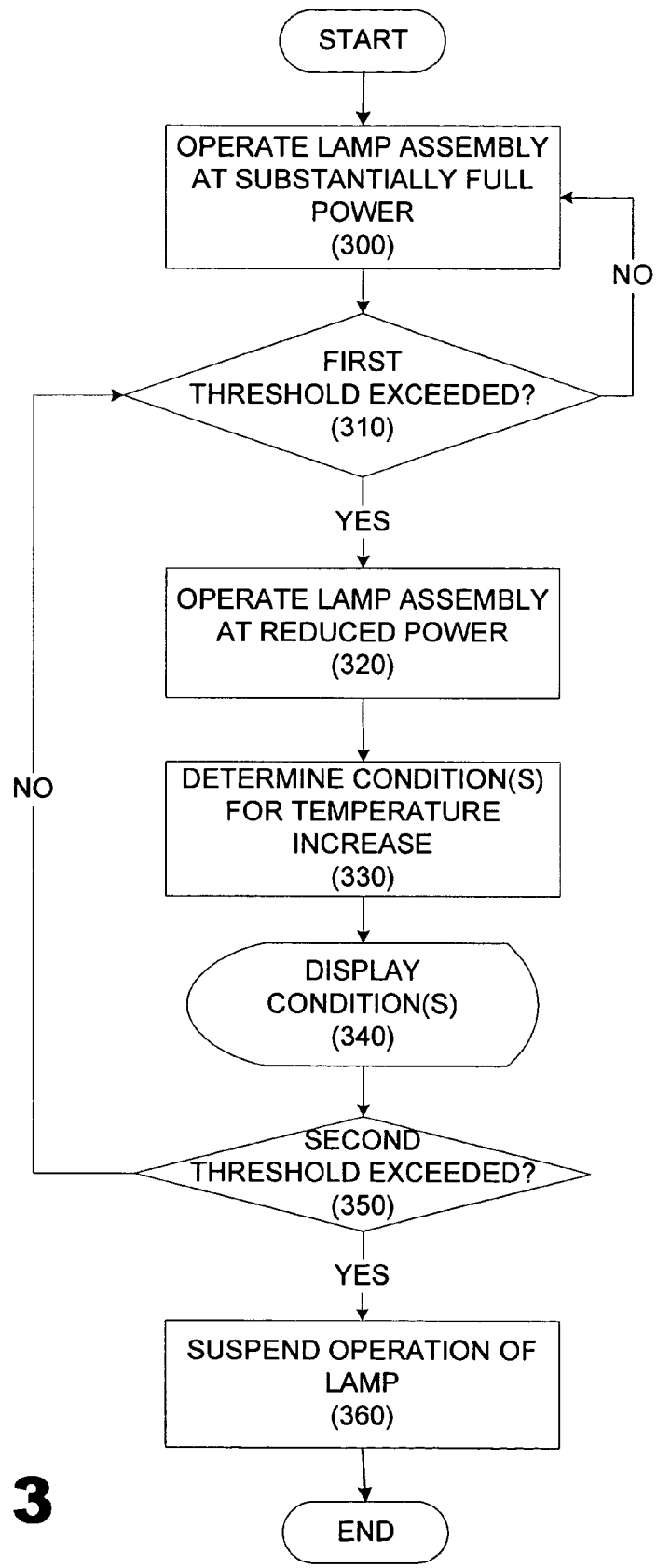
FIG. 3 is an operational schematic of a light source module according to one exemplary embodiment.

FIG. 3 illustrates a schematic view of an exemplary operation of a light source module that is configured to operate at reduced power in response to a rise in the temperature of the lamp assembly due to non-catastrophic conditions while providing an indication of such conditions. As seen in FIG. 3, during normal operation, the lamp assembly operates at substantially full power (step 300). In particular, according to one exemplary embodiment, the lamp assembly generates light while a cooling airflow is directed to the lamp assembly. As the air passes over the lamp assembly, the airflow removes heat from the lamp assembly thereby cooling it. The amount of heat that is allowed to accumulate in the lamp assembly, and thus the temperature of the lamp assembly, is dependent, at least in part, on how much heat is removed from the lamp assembly by forced convective cooling.

While the lamp is thus operating normally, one or more first thresholds may be monitored. For example, the temperature of the lamp assembly may be measured. While the first temperature thresholds remain unsurpassed, such that temperature of the lamp assembly remains below the first temperature threshold, the light source module may continue to operate at substantially full power.

If the first temperature threshold is surpassed, (YES, determination 310), the lamp assembly may be operated at a reduced power level (step 320). In addition to monitoring the first temperature threshold, the light source module may also determine which conditions within the lamp assembly may have contributed to the rise in temperature above the first temperature threshold (step 330). These conditions may include, without limitation, the characteristics of an airflow directed to the lamp assembly, such as temperature and volumetric flow rate. Once the condition(s) which may contribute to the elevated temperature have been determined (step 330), they may then be displayed (step 340).

In addition, while the light source module is operating at reduced power, the light source module may continue to monitor the temperature of the lamp assembly. In particular, the light source module may compare the operating temperature of the lamp assembly to a second temperature threshold (determination 350). If the temperature of the lamp assembly exceeds the second temperature threshold (YES, determination 350), operation of the lamp assembly is suspended (step 360).

If the temperature of the lamp assembly does not exceed the second temperature threshold (NO, determination 350), the light source module may again determine whether the first temperature threshold remains exceeded (determination 310). Accordingly, the schematic illustrates the operation of an exemplary light source module that is configured to operate at a reduced power level when a first temperature threshold has been surpassed. Additionally, the schematic illustrates the display of information related to possible conditions which may contribute to the temperature increase.

In conclusion, a light source module has been provided herein for use in display systems. According to one exemplary embodiment, the light source module includes a lamp assembly. The light source module is configured to reduce the power provided to the lamp assembly when the temperature of the lamp assembly exceeds a first temperature threshold. Further, the light source module may provide some type of indication for one or more non-catastrophic condition(s) which may contribute to the elevated temperature.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light source module, comprising:
   a lamp assembly;
   at least one temperature sensor for monitoring a temperature of an airflow for cooling said lamp assembly; and
   a processor communicatively coupled to said temperature sensor and said lamp assembly; said processor being configured to operate said lamp assembly at a reduced power level when said temperature is above a first temperature threshold.

2. The light source module of claim 1, wherein said processor controls a display to indicate a possible obstruction of an air outlet when said temperature is above said first temperature threshold.

3. The light source module of claim 1, wherein said processor is configured to monitor temperature varying conditions including obstruction of an outlet for said airflow.

4. The light source module of claim 3, further comprising a display coupled to said processor, said processor being configured to indicate a presence of said temperature varying conditions.

5. The light source module of claim 1, further comprising a fan configured to direct said airflow to said lamp assembly and a flow sensor for measuring a volume of said airflow.

6. The light source module of claim 5, wherein said processor is configured to monitor flow conditions of said airflow by receiving output from said flow sensor and operating said lamp at a reduced power level when said volume is below a minimum threshold.

7. The light source module of claim 6, further comprising a display controlled by said processor to indicate a possible obstruction of an air inlet when said volume is below said minimum threshold.

8. A method of operating a light source module, comprising:
   monitoring a volume and temperature of an airflow cooling a lamp assembly;
   providing power to said assembly at a first level if said temperature is below a first temperature threshold or said volume is above a first flow volume threshold; and
   providing power at a second level if said temperature is above said first temperature threshold or said volume is below said first volume threshold, said second power level being lower than said first power level.

9. The method of claim 8, further comprising indicating if any airflow conditions exceed said thresholds by causing a display to provide a visual indication.

10. The method of claim 8, further comprising cutting power to said lamp assembly if said temperature exceeds a second temperature threshold, said second temperature threshold being higher than said first temperature threshold.

11. The method of claim 8, further comprising providing a display for displaying information about operation of said lamp assembly.

12. The method of claim 11, further comprising displaying an indication on said display that an outlet for said airflow may be obstructed if said temperature of said airflow is above said first temperature threshold.

13. The method of claim 11, further comprising display an indication an said display that an inlet for said airflow may be obstructed if said volume of said airflow is below said first volume threshold.

14. A display system, comprising:
   a lamp assembly;
   means for monitoring a temperature and volume of an airflow cooling said lamp assembly; and
   means for displaying an indication to check for obstruction of an outlet for said airflow if said temperature is above a first temperature threshold and displaying an indication to check for obstruction of an inlet for said airflow if said volume is below a volume threshold.

15. The system of claim 14, further comprising means for reducing power to said lamp assembly if said volume is below said volume threshold.

16. The system of claim 14, further comprising means for reducing power to said lamp assembly if said temperature exceeds said first temperature threshold.

17. The system of claim 16, and further comprising means for suspending operation of said lamp assembly when said temperature exceeds a second temperature threshold, said second temperature threshold being greater than said first temperature threshold.

* * * * *

UNITED STATES PATENT AND TRADEMARK OFFICE
CERTIFICATE OF CORRECTION

PATENT NO. : 7,294,979 B2 Page 1 of 1
APPLICATION NO. : 11/139241
DATED : November 13, 2007
INVENTOR(S) : Matthew Beasley It is certified that error appears in the above-identified patent and that said Letters Patent is hereby corrected as shown below:

In column 8, line 19, in Claim 13, after "indication" delete "an" and insert -- on --, therefor.

Signed and Sealed this

Eighth Day of July, 2008

JON W. DUDAS
*Director of the United States Patent and Trademark Office*